United States Patent [19]

Sander

[11] Patent Number: 4,631,223
[45] Date of Patent: Dec. 23, 1986

[54] EMBOSSING FOILS HAVING A MAGNETIC LAYER

[75] Inventor: Helfried Sander, Nuremberg, Fed. Rep. of Germany

[73] Assignee: Messrs. Leonhard Kurz GmbH & Co., Fed. Rep. of Germany

[21] Appl. No.: 734,793

[22] Filed: May 16, 1985

[30] Foreign Application Priority Data

Jun. 20, 1984 [DE] Fed. Rep. of Germany ..... 34229116

[51] Int. Cl.$^4$ ............................................. B32B 3/00
[52] U.S. Cl. .................................... 428/172; 156/233; 156/235; 156/239; 156/240; 428/201; 428/206; 428/207; 428/209; 428/692; 428/913; 428/914; 428/915; 428/916
[58] Field of Search ............... 156/233, 235, 239–241; 428/172, 201, 204, 206–209, 211, 692, 694, 913–916

[56] References Cited

U.S. PATENT DOCUMENTS 4,223,057 9/1980 Rejto .................................. 428/172
4,463,034 7/1984 Tokunaga et al. .................. 428/694
4,503,110 3/1985 Skene ................................. 428/172

Primary Examiner—George F. Lesmes
Assistant Examiner—P. R. Schwartz
Attorney, Agent, or Firm—Louis E. Marn

[57] ABSTRACT

An embossing foil includes a layer which can be written upon, together with a magnetic layer for data storage purposes. Between the magnetic layer and the writing layer, the foil has a layer with a barrier effect to prevent the writing layer from being attacked by solvent contained in the magnetic layer. The foil may further comprise between the magnetic and writing layers, a structure producing an optical diffraction effect such as a hologram, with the writing surface and said structure being so arranged that nonetheless said structure can still be read, including by machine.

19 Claims, 2 Drawing Figures

EMBOSSING FOILS HAVING A MAGNETIC LAYER

BACKGROUND OF THE INVENTION

The invention relates generally to embossing foils and more particulary to hot embossing foils.

U.S. Pat. No. 4 376 006 discloses an embossing foil construction comprising a backing foil and a transfer layer which can be released therefrom and which comprises at least a magnetic layer consisting of a dispersion of magnetisable particles in a binding agent. A metal layer and a layer of lacquer are provided on the side of the magnetic layer which is towards the backing foil, while the magnetic layer is possibly provided with an adhesive layer, on the side thereof which is remote from the backing foil, for fixing the transfer layer to a substrate to which it is to be applied. That design seeks to afford the possibility of the magnetic embossing foil also being produced in bright, attractive colours, for which purpose the magnetic layer, which is generally dark, is covered by the metal layer. Purely decorative purposes are therefore the consideration in that respect.

It is conventional practice for for example cheque cards, credit cards, savings books and similar security documents and items to be provided with magnetic strips, strips which can be signed thereon or structures which have a particular optical effect in order thereby to make it possible to store certain items of data or to enhance the safeguards against forgery. An advantage when using magnetic strips is that it is very easily possible to provide for suitable storage of relevant data in the magnetic strip. However, there is the disadvantage that forgery or erasure is a comparatively simple manner with the usual forms of magnetic strips. In principle that depends on the way in which the magnetic strip is applied. It is true to say that for many areas of use, it has been found to be advantageous for the magnetic strips to be applied by means of embossing foils such as hot-process embossing foils because in that case the strip can be easily applied to the security document or like item, and it is even possible for the magnetic strip to be coded before being applied to the document or card in question.

Some forms of security documents or items, for example credit cards and cheque cards, additionally include an area or panel for bearing a signature thereon, with the card being valid only after having been signed in the appropriate area. Signature areas of that kind are already being produced using embossing foils, in which connection the attempt has already been made to improve the safeguards in regard to forgery of the card by virtue of the signature areas having a background of a specific nature, for example by means of a suitable imprint, by using a background material which changes in colour when an attempt at erasure is made or which reacts with the writing liquid to undergo a change in colour, and so forth. In the past however the signature surfaces were always produced in a separate working operation at a location which was provided only specifically for that purpose, as it was assumed that the signature had to be at a location which was not used for other purposes. Any magnetic strips on the same card were always disposed completely separate from the area which was intended to bear the signature of the card holder.

SUMMARY OF THE INVENTION

An object of the present invention is to provide an embossing foil which is capable of being readily used as a data carrier for carrying variable data while also affording the possibility of providing a signature area.

Another object of the present invention is to provide an embossing foil which affords an enhanced degree of protection from forgery.

A further object of the present invention is to provide an embossing foil which provides a compact combination of space for a signature thereon and means for carrying variable or fixed data stored therein.

Still a further object of the invention is to provide an embossing foil which, while being easy to operate on and permitting signature thereon, is of an attractive appearance and affords and enhanced area for information thereon.

In accordance with the present invention, these and other objects are achieved by an embossing foil such as a hot embossing foil which comprises a backing foil and a transfer layer means which can be released therefrom and which includes at least a magnetic layer comprising a dispersion of magnetisable particles in a binding agent, which optionally carries on its side remote from the backing foil an adhesive layer for fixing the transfer layer means to a substrate to which it is to be applied. On the side of the magnetic layer which is towards the backing foil, the transfer layer is provided at least in a region-wise manner thereon with at least a layer of lacquer which can be written upon, thereby forming a signing layer, and which, after the embossing operation and removal of the backing foil, forms the exposed surface of receiving writing or like marking, while provided between the signing layer and the magnetic layer is a barrier layer for preventing the signing layer from being dissolved or attacked by solvent contained in the magnetic layer.

The barrier layer is advantageously formed by a layer of a cross-linking lacquer, but it may also be formed for example by a thin layer of a non-magnetisable metal which is for example applied by a vapour deposit process.

Therefore, the foil in accordance with the present invention includes on the one hand a magnetic layer so that it can store variable or fixed data, wherein coding of the magnetic layer can be effected in per se known manner. A particularly important consideration however is that the magnetic layer is covered by a layer which can be written upon or likewise marked, forming the signing layer. The signing layer may extend over the entire area of the magnetic layer or it may only be disposed in regions thereof, for example in discrete surface portions which are adequate to form the area for receiving a signature. The fact that the signing layer is provided over the magnetic layer, in the finished product, affords the advantage that less space is required on for example a card for the magnetic strip and the signature area, which may be desirable on the one hand in regard to the possibility of reducing the size of the card, or on the other hand in regard to increasing the amount of space available for signature and for the storage of data in the magnetic layer. In addition, the signing layer may be substantially more attractive in appearance than the metal layer which is generally comparatively dark, because of the metal pigment contained therein, and thus is in substantial contrast to credit or cheque cards which are usually light. Moreover, in spite of the presence of the magnetic layer, the signing layer may be of a graphic configuration, in a similar manner to the foils designed hitherto for signature areas or panels, or it may be provided with additive means which make it difficult or impossible to forge a signature thereon. Therefore, the present invention provides a foil which on the one hand affords a substantial simplification in the work involved in applying a magnetic strip or signature panel or area to credit cards and the like, while on the other hand being substantially more attractive in appearance than the previous magnetic strips. Finally, the signing layer may be larger in area than that found on previous cards of the same size.

In order for the surface of the signing layer to be sufficiently rough satisfactorily to receive a signature or like writing thereon, the signing layer is desirably formed by a rough layer of lacquer which breaks up in itself upon removal of the backing foil. The lacquer forming the signing layer may be a layer with sufficient addition of pigment thereto.

In connection with documents or security items which have a magnetic strip, attempts are sometimes made to manipulate the variable data stored in the magnetic strip, for example to make it appear that the card represents a higher level of credit in an account or possibly represents a higher credit limit in the case of a credit card. For that reason, various methods have been put forward in an effort to enhance the safeguards against forgery and falsification of the data stored in magnetic strips. For example, one such method provides that formed in the coating of the magnetic strip is a pattern in the magnetisable pigments, which pattern is disposed at an angle of 45° with respect to the longitudinal direction of the strip. That 45° basic pattern in regard to the magnetisation of the strip cannot be altered at a cost which is usually feasible from the point of view of a person wishing to falsify such data, with the known equipment.

Another method which can be used is to employ a two-layer magnetic strip, wherein one layer has a high coercive force, that is to say, it carries items of information which are difficult to alter, while the other layer wich is usually over the first-mentioned layer carries the erasable data, with a low level of coercive force. However, such two-layer magnetic strips are comparatively difficult to manufacture and give rise to problems in regard to encoding thereof. In addition, when such magnetic strips are used, there is no possibility of providing an additional layer which can be written upon.

Now, in order to enhance the safeguards against forgery or falsification, the invention further proposes in a preferred embodiment that the transfer layer, between the magnetic layer and the signing layer, includes at least one diffraction layer for receiving a structure which has an optical diffraction effect, for example a holographic structure, wherein the signing layer is applied in a region-wise manner in such a way that said structure, after release of the backing foil, is still detectable from the side of the signing layer. In the foil in accordance with the present invention, the above-mentioned structure makes it possible to store non-variable data, for example fixed data relating to the holder of the card and so forth, in addition to the variable data which are stored in the magnetic layer. If then an attempt is made to alter the above-mentioned fixed data, the structure and possibly even the magnetic layer will suffer damage or be destroyed as a result. That is the case in particular because the above-mentioned structure is provided beside the signing layer. In spite of the presence of the diffraction structure and the signing layer, the foil in accordance with the invention may be of such a nature that the layers which are disposed over the magnetic layer are so thin that the signal generated by the magnetic layer complies with the relevant standards in that respect. In that connection, the admissible thickness of the signing layer and the diffraction layer essentially depends on the magnetic properties of the magnetic layer, more particularly the nature, state of dispersion, orientation relationship, level of pigmentation and thickness of the magnetic layer, and obviously also the pigment used. Tests have shown that it is possible to use comparatively thin magnetic layers which are less than 10 $\mu$m in thickness, and that aspect has in particular advantageousconsequences on the workability and handleability of the foil as well as the properties thereof, for example in regard to cohesion of the layers. Furthermore, in spite of the provision of the diffraction layer, the signing layer may be so smooth, more particularly because it lies directly against the backing foil, that, after the foil has been embossed into position, the foil provides a very low level of surface roughness, because in fact the degree of smoothness of the surface depends on the surface of the backing foil. If for example the backing foil comprises a polyester film, it can be assumed that the degree of surface roughness thereof is less than 1 $\mu$m, that is to say, it is far superior to the standard required in respect of magnetic foils, of a mean value of roughness of a maximum of 2.5 $\mu$m.

In accordance with the present invention, it is possible for the signing layer to be provided only in surface portions of the embossing foil, which are distinguished from the surface portions where the diffraction structure is to be found. For example, the diffraction structure may be provided beside the signature area.

However, it is particularly desirable for the signing layer to be arranged to cover the diffraction layer only in a grid-like or pattern-like configuration. With a foil of such a nature, the signing layer is only applied in a grid-like configuration as by an imprinting process, with the option of using different grid-like patterns, for example a dot grid, a line grid or grids or patterns in the form of a character of quite specific configuration. In spite of the fact that the signing layer is applied to the foil in such a manner that it covers the diffraction layer in a grid-like pattern, the diffraction structure such as a hologram can still generally be recognised or even read by means of a suitable machine because, in regard to holograms and other specific structures which have an optical diffraction effect, it is to be assumed that such holograms or structures still supply all their information even when a part thereof is covered or masked. That is because each element of the surface of the diffraction structure is capable of supplying the whole of the items of information stored in the structure, although obviously in that case only with a reduced signal-noise ratio.

As will be appreciated, the fact that the signing layer is applied only to limited surface portions of the foil would have the result that the free surface of the foil, after removal of the backing foil, would be uneven, which is undesirable. To prevent that occurring, the invention further proposes in a preferred embodiment that the surface portions of the diffraction layer and/or the magnetic layer, which are not covered by the signing layer, are to be covered with a layer of clear lacquer of suitable thickness, to form a flat and even surface for the transfer layer. The layer of clear lacquer is desirably formed by a release or peel-off lacquer. The layer of clear lacquer does not interfere with readability of the optical diffraction-effect structure. If the layer of clear lacquer is formed by a release lacquer, as referred to above, in that case there is no need to provide a separate separation or release layer between the backing foil and the signing layer. Furthermore, a construction of that nature has the advantage that the signing layer comes away from the backing foil less easily than the layer of clear lacquer, with the result that pieces of the signing layer remain clinging to the backing foil and thus impart roughness to the surface of the signing layer, to a degree which is adequate to facilitate writing thereon.

In accordance with an advantageous embodiment of the invention, the optical diffraction-effect structure is formed in or embossed into a layer of a protective lacquer for the magnetic layer, with the layer of protective lacquer serving as a diffraction layer, thus with the structure being formed for example in the barrier layer between the magnetic layer and the signing layer. As will be appreciated, when the barrier layer is used for carrying the diffraction structure, that does not result in any increase in thickness in comparison with the conventional magnetic embossing foils. Furthermore, manufacture of the foil is very simple as, apart from the operation of forming or embossing the optical diffraction-effect structure, there is no need for any further working operation. In addition, when the diffraction structure is provided on the side of the diffraction layer which is towards the magnetic layer, that gives the advantage that that structure is still protected after the backing foil has been removed, and in particular the degree of smoothness of the exposed surface of the foil is not adversely affected.

The structures giving an optical diffraction effect will generally be holographic diffraction structures. Such structures may be visible holograms or holograms which are not visible with the naked eye or under normal conditions of lighting. In addition, the term 12 structure with an optical diffraction effect', or corresponding term such as, simply, diffraction structure, in accordance with the invention, embraces both those structures which can be read by machine and structures which do not permit machine reading thereof. Particularly when the diffraction structure is to be visible with the naked eye or such that it can be read by machine, it is desirable for a layer of a non-magnetisable metal to be provided on the side of the magnetic layer which is towards the backing foil, between the magnetic layer and a layer of protective lacquer, the metal layer providing the diffraction structure. The metal layer is desirably a layer of aluminium or an aluminium alloy, which is applied by vapour deposit. The presence of an additional metal layer in that way can improve visibility of the diffraction structure, while it may also provide further effects in regard to the appearance of the document to be safeguarded, which may be an important consideration in regard to certain areas of use such as credit cards and the like.

Finally, in accordance with a preferred feature of the invention, the magnetic layer and/or the signing layer and/or the diffraction layer and/or the layer of clear lacquer and/or the barrier layer is or are coloured, thereby producing particular decorative or optical effects.

The layers of lacquer may be applied by means of the processes which are known in connection with the manufacture of embossing foils, depending on the viscosity of the lacquer used and the thicknesses of the respective layers, for example by means of pattern rollers (intaglio printing), roller-type squeegee or doctor, a reverse roller process, casting and so on. The metallisation operations may also be carried out using known processes which operate without pigment, for example vacuum vapour deposit or cathode ray sputtering.

Further objects, features and advantages of the invention will be apparent from the following description of two preferred embodiments of hot process embossing foils according to the invention.

DESCRIPTION OF PREFERRED EMBODIMENTS

Figure 1:
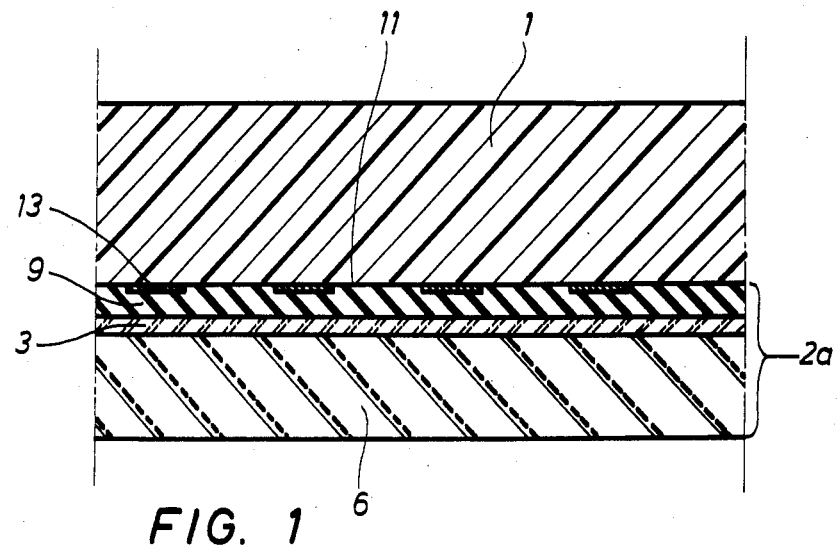
FIG. 1 shows a view in section through an embossing foil having a magnetic layer and a signing layer.

Referring to the drawings, shown therein are embodiments of embossing foils which each include a carrier or backing foil 1 which is for example about 19 $\mu$m in thickness and which comprises any suitable material such as polyethylene glycol terephthalate. Applied by printing to the backing foil 1 is a transfer layer 2a (FIG. 1) or 2b (FIG. 2) which can be released from the backing foil 1 after it has been applied to a substrate to which it is to be secured. The difference between the foils shown in FIGS. 1 and 2 respectively lies in the nature of the transfer layers 2a and 2b.

Referring now to FIG. 1, starting from the backing foil 1, the transfer layer 2a comprises a signing layer 9 which is partially interrupted by intermediate layer portions as indicated at 13, which are applied for example by a printing process, thereby constituting layer portions which are disposed in recesses in the surface of the signing layer 9 which, after removal of the backing foil 1, will form the exposed surface as indicated at 11. The transfer layer 2a further comprises a layer 3 of separation or release lacquer, and a magnetic layer 6. It should be appreciated that the thicknesses of the respective layers are not shown as true to scale. For example, the polyester film is about 10 to 25 and preferably 19 $\mu$m in thickness while the signing layer 9 may be 0.5 to 2 and preferably about 1.5 $\mu$m in thickness. The thickness of the layer 3, which comprises a cross-linked lacquer, is between 0.5 and 1, preferably about 0.8 $\mu$m. The magnetic layer is of the usual thickness of 4 to 13 and preferably about 9 $\mu$m.

It would optionally be possible for an adhesive layer to be provided adjoining the magnetic layer 6, with the thickness of the adhesive layer being from 0 to 4 $\mu$m, preferably about 1.5 $\mu$m. However, having regard to the specific composition of the magnetic layer 6, it is frequently possible to omit the adhesive layer, particularly when the embossing foil shown in FIG. 1 is to be applied for example to cards comprising PVC.

The layers 3, 6, 9 and 13 shown in FIG. 1 are of the following compositions:

Lacquer A (signing layer 9)

| Component | Parts by wt |
|---|---|
| PVC/PVac copolymer | 4000 |
| Ester-soluble low-viscosity nitrocellulose | 2000 |

-continued

| Component | Parts by wt |
| --- | --- |
| Oil-free alkyd | 50 |
| Flow agent | 800 |
| Dioctylphthalate | 500 |
| Methyl ethyl ketone | 25000 |
| Toluene | 2000 |
| Ethyl acetate | 2000 |
| Cyclohexanone | 1000 |
| Diacetone alcohol | 1000 |
| Titanium dioxide (rutile) | 20000 |
| Lubricant | 1000 |

Lacquer B (decorative printing 13)

Composition as defined above in relation to lacquer A, but further including:

| Component | Parts by wt |
| --- | --- |
| Complex metallic dyestuff Black | 250 |
| Complex metallic dyestuff Blue 807 | 180 |
| Pigment preparation in maleinate resin (carmine) | 100 |

Lacquer C (barrier layer 3)

| Component | Parts by wt |
| --- | --- |
| Methyl-/n-butylmethacrylate | 1000 |
| Low-viscosity cellulose | 1000 |
| Phenol-modified colophony | 500 |
| Methyl ethyl ketone | 4000 |
| Toluene | 3000 |
| Ethyl acetate | 1500 |
| 98/100 butylacetate | 3000 |

Lacquer D (magnetic layer 6)

The magnetic layer 6 comprises a dispersion of needle-like $\gamma$-$Fe_2O_3$ magnetic pigment in a polyurethane binding agent, various lacquer additives and a solvent mixture comprising methyl ethyl ketone and tetrahydrofuran. Such magnetic dispersions are known per se. However, the magnetic layer does not necessarily have to be of the above-indicated composition. For example, instead of the $Fe_2O_3$ pigment, it would also be possible to use other magnetic pigments, for example Co-doped magnetic iron oxides or other finely dispersed magnetic materials such as Sr or Ba-ferrite. The combination of binding agents of the magnetic layer is adapted to the substrate to which the foil is to be applied.

The operating procedure in manufacture of the foil shown in FIG. 1 is as follows:

Taking the backing foil 1, the lacquer B is first applied to form the layer portions 13, in a given pattern, for example a decorative arrangement, by means of an intaglio printing process, with the weight of application of the lacquer B being 0.4 g/m², the degree of surface covering being taken as 0.2. The lacquer A is than applied by a similar process in a line grid or pattern, with the weight of application being 5.0 g/m², followed then by the lacquer C which is applied by a similar process and in a line grid or pattern, but in a weight of only about 1.5 g/m². Drying is effected in each case at about 100° to 120° C.

In that connection, the lacquer C is such that it represents a barrier or blocking layer between the magnetic layer which is subsequently to be applied, and the usually light lacquer forming the signing layer 9.

After the layers of lacquer A, B and C have dried, the magnetic dispersion for forming the magnetic layer is applied in per se known manner, with the needles of the magnetic dispersion, while the lacquer is still in a wet condition, being aligned in the longitudinal direction of the foil by means of strong magnets. The foil is then calendered in the usual manner for magnetic foils.

For the purposes of checking the magnetic properties of the transfer layer 2a, the transfer layer is applied to PVC cards by a per se known hot embossing process (for example by being rolled over at a temperature of 180° C.), and the signal reading voltage is determined, in dependence on the writing current strength. Tests have shown that the foil complies with the requirements of the usual standards in regard to signal strength and abrasion resistance, as well as surface roughness.

Figure 2:
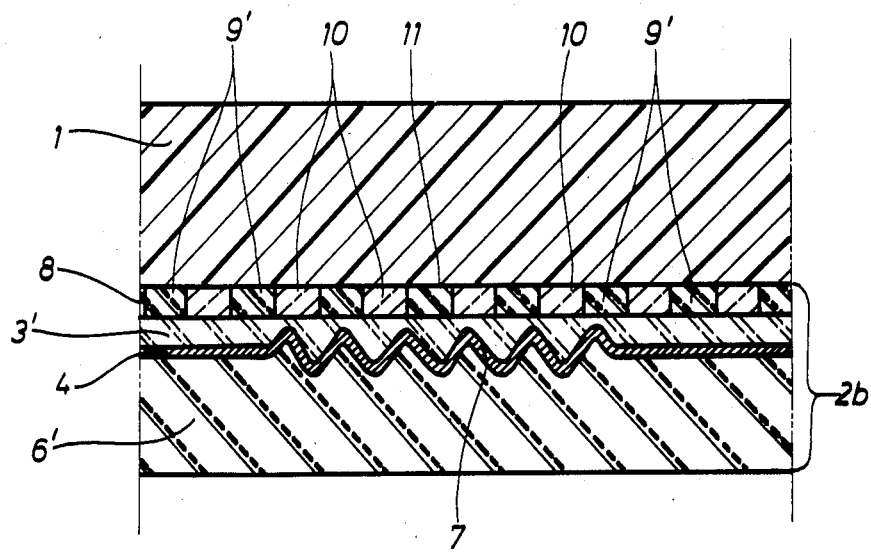
FIG. 2 shows a view in section through a hot embossing foil with a magnetic layer, a diffraction layer and a signing layer.

Reference will now be made to FIG. 2 showing a second embodiment of the foil in accordance with the principles of this invention. As shown therein, the transfer layer 2b, like the transfer layer 2a shown in FIG. 1, includes a magnetic layer 6 as well as a surface layer 8 which is provided at least in a region-wise manner with a lacquer 9' which can be written upon or similarly marked. The major difference between the foil shown in FIG. 2 and that shown in FIG. 1 is that in the FIG. 2 foil the transfer layer 2b is additionally provided with a structure 7 which has an optical diffraction effect.

In the foil shown in FIG. 2, the surface layer 8 must be of such a configuration that, in spite of its presence in the foil after the foil has been suitably applied by an embossing process to a substrate to which it is to be secured, that is to say, when the backing foil 1 has been removed, the structure 7 is still visible from the side of the backing foil 1, that is to say, when viewing on to the exposed surface of the layer 8. That is achieved by virtue of the fact that the actual signing layer afforded by the layer 8 is provided only in certain regions or portions thereof. For that purpose, in the illustrated embodiment, the layer 8 is formed from two kinds of lacquers, namely the lacquer 9' which is usually not transparent and which is applied in a grid-like or pattern configuration, for example as a dot grid or pattern, line grid or pattern, and so forth, as well as a further transparent or translucent lacquer 10 which is provided in the respective spaces or openings formed between the lacquer portions 9'. The lacquer 9' and the lacquer 10 filling the spaces between the portions of the lacquer 9' are of substantially the same thickness so as to provide a surface, which is towards the backing foil 1, that is substantially flat, as indicated at 11. The surface 11 will subsequently form the exposed surface of the signing layer, when the backing foil 1 is removed. In spite of the presence of the non-transparent lacquer 9', the structure 7 can still be read, particularly when it is a hologram, even if it produces a poorer signal-noise ratio, as it is possible with holograms for all the items of information to be stored in every region thereof.

The lacquers used in the FIG. 2 embodiment are as follows:

Lacquer F (transparent lacquer 10)

| Components | Parts by wt |
| --- | --- |
| High-molecular PMMA resin | 2000 |
| Oil-free silicone alkyd | 300 |

-continued

| Components | Parts by wt |
| --- | --- |
| Non-ionic wetting agent | 50 |
| Low-viscosity nitrocellulose | 750 |
| Methyl ethyl ketone | 12000 |
| Toluene | 2000 |
| Diacetone alcohol | 2500 |

Lacquer G (lacquer 9')

| Component | Parts by wt |
| --- | --- |
| PVC/PVac copolymer | 4000 |
| Low-viscosity nitrocellulose | 2000 |
| Oil-free alkyd | 50 |
| Silicone polyester resin | 2000 |
| Flow agent | 800 |
| Dioctylphthalate | 500 |
| Methyl ethyl ketone | 25000 |
| Toluene | 2000 |
| Ethyl acetate | 2000 |
| Cyclohexanone | 1000 |
| Diacetone alcohol | 1000 |
| Calcium carbonate | 25000 |

Lacquer H (diffraction layer 3')

| Component | Parts by wt |
| --- | --- |
| Methyl/n-butyl methacrylate | 1000 |
| Low-viscosity nitrocellulose | 1000 |
| PHenol-modified colophony | 500 |
| Methyl ethyl ketone | 4000 |
| Toluene | 3000 |
| Ethyl acetate | 1500 |
| 98/100 butyl acetate | 3000 |

Magnetic layer 6' (see Example 1)

The procedure for producing the foil shown in FIG. 2 is as follows.

Using a two-colour printing machine with a degree of register inaccuracy of less than 0.05 mm, using two intaglio printing pattern rollers, lacquers F and G are printed in a condition of precise and close interengagement with each other (to form the lacquer portions 9' and 10), on a polyethylene glycol terephthalate foil 19 $\mu$m in thickness. The lacquers F and G are initially produced in compliance with the above-indicated requirements, but with a reduced solvent content, and then after test printing are diluted down to such a degree that the dry layer thickness in respect of the two lacquers is just of the same magnitude and is about 1.5 $\mu$m. That produces on the backing foil 1 a continuous layer 8 of substantially uniform thickness which is made up of portions 9' of the lacquer G which can be written upon, and other portions 10 formed by the lacquer F. At the same time, the lacquer F has the property of easily separating from the backing foil 1 while the lacquer G possibly clings to the backing foil so that when the backing foil 1 is peeled off, the lacquer D suffers from tearing at its surface and thus provides a rough surface to which writing can be more readily applied.

Subsequently to the operation of applying the lacquers F and G to the foil, the lacquer H is applied with a line pattern or grid intaglio printing roller, in a weight of 1.2 g/m$^2$, and then dried at 120° C. Then, the diffraction structure 7, being in the present case for example a hologram, is embossed or impressed into the lacquer H at a temperature of about 130° C. by means of a die comprising for example nickel. That operation is effected at different times, in dependence on the formula of the lacquer used for forming the layer 3'. After the structure 7 has been formed, the layer of lacquer 3' is caused to set by cross-linking or in some other fashion. For the purposes of producing the structure 7, the die is preferably electrically heated and, before being lifted away from the lacquer layer 3' after the operation of forming the structure 7, can be cooled down again.

As soon as the structure 7 has been produced and the layer 3' is sufficiently hard, aluminium is applied by vapour deposit to the layer 3', at a pressure of about $1.3 \cdot 10^{-4}$ mbar, with the thickness of the layer being about $200 \cdot 10^{-10}$ mA.

The magnetic dispersion 6' is then applied, with the thickness thereof being about 9 $\mu$m, and finished in the usual fashion by calendering and suitably aligning the magnetic particles in the dispersion.

In principle, it would also be possible for the structure 7 not to be directly embossed or impressed into the layer 3', but for the metal layer 4 to be applied firstly, and for the structure 7 then to be formed therein.

In the usual tests, the foil illustrated in FIG. 2 also shows that it complies with the requirements set by the relevant standards in respect of magnetic data carriers, in particular in regard to adequate signal voltages and sufficient resistance to wear and abrasion.

It will be seen that the layer 3 in the embodiment of FIG. 1, and the layer 3' in conjunction with the layer 4 in the embodiment shown in FIG. 2 constitute a barrier or blocking layer which is capable of preventing the signing layer 9 or 9' and 10 from being attacked or dissolved by a solvent contained in the magnetic layer 6.

The embodiments described hereinbefore with reference to FIGS. 1 and 2 have been set forth solely by way of example of the principles of the present invention, and other modifications and alterations may be made therein without thereby departing from the spirit and scope of the present invention.

What is claimed is:

1. An embossing foil comprising a backing foil having first and second surfaces, and on said first surface a transfer layer means which is releasable therefrom, said transfer layer means including a magnetic layer having first and second sides and comprising a dispersion of magnetisable particles in a binding agent, said transfer layer means at said first side of the magnetic layer which is towards the backing foil being provided at least in a region-wise manner thereon with at least one layer of lacquer which after removal of the backing foil provides a surface which can be written upon to constitute a signing layer, wherein provided between said signing layer and said magnetic layer is a blocking layer adapted to prevent the signing layer from being attacked by solvent contained in said magnetic layer.

2. An embossing foil as set forth in claim 1 wherein said signing layer is formed by a rough layer of lacquer which tears in itself upon removal of the backing foil.

3. An embossing foil as set forth in claim 1 wherein said blocking layer is formed by a layer of cross-linking resin.

4. An embossing foil as set forth in claim 1 wherein surface portions of the magnetic layer which are not covered by said signing layer are covered with a layer of clear lacquer of suitable thickness to form a flat surface on said transfer layer means.

5. An embossing foil as set forth in claim 4 wherein said layer of clear lacquer is formed by a release lacquer.

6. An embossing foil as set forth in claim 4 wherein said layer of clear lacquer is coloured.

7. An embossing foil as set forth in claim 1 and further including at said second side of said transfer layer means an adhesive layer adapted to secure said transfer layer means to a substrate to which it is to be applied.

8. An embossing foil as set forth in claim 1 wherein a surface configured to provide an optical diffraction structure is provided between said magnetic layer and said signing layer, and said signing layer covers only separated portions of said blocking layer so as to permit a viewing, between said separated portions, and of said optical diffraction structure upon removal of said backing foil.

9. An embossing foil as set forth in claim 8 wherein said configured surface achieves a hologram effect.

10. An embossing foil as set forth in claim 8 wherein said signing layer covers said blocking layer in a grid-like pattern.

11. An embossing foil as set forth in claim 8 wherein portions of said blocking layer not covered by said separated portions of said signing layer are covered by a layer of clear lacquer of suitable thickness to form, with said signing layer, a flat surface of said transfer layer means.

12. An embossing foil as set forth in claim 11 wherein said layer of clear lacquer is formed by a release lacquer.

13. An embossing foil as set forth in claim 11 wherein said layer of clear lacquer is coloured.

14. An embossing foil as set forth in claim 8 wherein said blocking layer is formed by a layer of protective lacquer for said magnetic layer, and said optical diffraction structure is embossed into said layer of protective lacquer.

15. An embossing foil as set forth in claim 8 wherein said optical diffraction structure is embossed into a surface of said blocking layer disposed towards said magnetic layer.

16. An embossing foil as set forth in claim 8, and further including a layer of non-magnetisable metal formed upon a surface of said blocking layer disposed towards said magnetic layer.

17. An embossing foil as set forth in claim 16 wherein said non-magnetisable metal is a layer of aluminum applied by vapour deposit.

18. An embossing foil as set forth in claim 16 wherein said non-magnetisable metal is a layer of aluminum alloy applied by vapour deposit.

19. An embossing foil as set forth in claim 8 wherein said blocking layer is coloured.

* * * * *